(12) United States Patent
Zhang

(10) Patent No.: US 12,423,912 B2
(45) Date of Patent: Sep. 23, 2025

(54) CONSTRUCTION OF THREE-DIMENSIONAL ROAD NETWORK MAP

(71) Applicant: BEIJING BAIDU NETCOM SCIENCE TECHNOLOGY CO., LTD., Beijing (CN)

(72) Inventor: Junjun Zhang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 278 days.

(21) Appl. No.: 18/180,670

(22) Filed: Mar. 8, 2023

(65) Prior Publication Data
US 2023/0222734 A1 Jul. 13, 2023

(30) Foreign Application Priority Data
Mar. 15, 2022 (CN) .......................... 202210252274.4

(51) Int. Cl.
*G06T 17/05* (2011.01)
*G01C 21/00* (2006.01)
(Continued)

(52) U.S. Cl.
CPC .......... *G06T 17/05* (2013.01); *G01C 21/3819* (2020.08); *G01C 21/3852* (2020.08);
(Continued)

(58) Field of Classification Search
CPC .......... G06T 17/05; G06T 7/521; G06T 7/70; G06T 2207/10028; G06T 2207/10032; G06T 2207/20021; G06T 2207/30181; G06T 2210/56; G06T 7/10; G06T 2207/10024; G06T 2207/20044; G06T 2207/30184; G06T 2200/08;
(Continued)

(56) References Cited

U.S. PATENT DOCUMENTS 11,380,002 B2 * 7/2022 Shu ..................... G01C 21/3804
12,026,929 B2 * 7/2024 Seveček ................. G06V 20/70
(Continued)

FOREIGN PATENT DOCUMENTS

CN 107704837 A 2/2018
CN 109948477 A 6/2019
(Continued)

OTHER PUBLICATIONS

Jingxin Su, "High-Resolution Representation for Mobile Mapping Data in Curved Regular Grid Model", 2019, Sensors. (Year: 2019).*
(Continued)

*Primary Examiner* — Gregory A Morse
*Assistant Examiner* — Ronde Lee Miller
(74) *Attorney, Agent, or Firm* — Leydig, Voit & Mayer, Ltd.

(57) ABSTRACT

A method for constructing a three-dimensional road network map is disclosed. The method includes: extracting a two-dimensional road based on a satellite remote sensing image; skeletonizing the two-dimensional road to obtain a two-dimensional road network map; and determining a height of each point in the two-dimensional road network map based on an elevation of three-dimensional point cloud data, to obtain the three-dimensional road network map.

18 Claims, 5 Drawing Sheets

(51) Int. Cl.
*G06T 7/521* (2017.01)
*G06T 7/70* (2017.01)
*G06V 10/34* (2022.01)
*G06V 20/10* (2022.01)
*G06V 20/70* (2022.01)

(52) U.S. Cl.
CPC ................ *G06T 7/521* (2017.01); *G06T 7/70* (2017.01); *G06V 10/34* (2022.01); *G06V 20/182* (2022.01); *G06V 20/70* (2022.01); *G06T 2207/10028* (2013.01); *G06T 2207/10032* (2013.01); *G06T 2207/20021* (2013.01); *G06T 2207/30181* (2013.01); *G06T 2210/56* (2013.01)

(58) Field of Classification Search
CPC ............ G01C 21/3819; G01C 21/3852; G06V 10/34; G06V 20/182; G06V 20/70
See application file for complete search history.

(56) References Cited

U.S. PATENT DOCUMENTS

| | | | |
|---|---|---|---|
| 2016/0247029 | A1 | 8/2016 | Dorum |
| 2020/0263998 | A1 | 8/2020 | An et al. |
| 2021/0342586 | A1* | 11/2021 | Fleisig ................. G06V 10/457 |
| 2023/0111511 | A1* | 4/2023 | Zhang .................... G06T 17/05 |
| | | | 701/450 |
| 2023/0206556 | A1* | 6/2023 | Chong ..................... G06T 7/174 |
| 2023/0221136 | A1* | 7/2023 | Rodrigues .......... G01C 21/3852 |
| | | | 701/450 |
| 2023/0221139 | A1* | 7/2023 | Rodrigues .............. G06V 20/13 |
| | | | 701/450 |
| 2023/0221140 | A1* | 7/2023 | Rodrigues ............. B60W 60/00 |
| | | | 701/400 |
| 2023/0222733 | A1* | 7/2023 | Zhang ..................... G06T 17/05 |
| | | | 345/419 |
| 2023/0222734 | A1* | 7/2023 | Zhang ..................... G06V 20/70 |
| 2023/0222788 | A1* | 7/2023 | Rodrigues .......... G01C 21/3852 |

FOREIGN PATENT DOCUMENTS

| | | |
|---|---|---|
| CN | 111721308 A | 9/2020 |
| CN | 113920260 A | 1/2022 |
| CN | 114018239 A | 2/2022 |

OTHER PUBLICATIONS

Yuan et al., "ADAS 3D Map Construction Method Based on the Sparse Point Cloud," Geospatial Information, vol. 14, No. 7 (Jul. 21, 2016).

Liang et al., "Fast 3D modeling of urban road network based on GIS data," Electronic Measurement Technology, vol. 41, No. 9, pp. 69-74 (May 2018).

* cited by examiner

CONSTRUCTION OF THREE-DIMENSIONAL ROAD NETWORK MAP

CROSS-REFERENCE TO RELATED APPLICATIONS

This application claims priority to Chinese Patent Application No. 202210252274.4, filed on Mar. 15, 2022, the entire content of which is hereby incorporated by reference.

TECHNICAL FIELD

The present disclosure relates to the technical field of computers, in particular to the technical fields of high-precision maps, map construction, positioning and navigation, and intelligent transportation, and specifically relates to a method and apparatus for constructing a three-dimensional road network map, an electronic device and a storage medium.

BACKGROUND

At present, most road network map data are two-dimensional maps. In mountainous areas with large terrain fluctuations, the road network precision is low, and a three-dimensional road network map cannot be represented, resulting in poor user experience.

SUMMARY

The present disclosure provides a method for constructing a three-dimensional road network map, an electronic device, a storage medium and a computer program product.

According to one aspect of the present disclosure, a method for constructing a three-dimensional road network map is provided, including: extracting a two-dimensional road based on a satellite remote sensing image; skeletonizing the two-dimensional road to obtain a two-dimensional road network map; and determining a height of each point in the two-dimensional road network map based on an elevation of three-dimensional point cloud data, to obtain the three-dimensional road network map.

According to another aspect of the present disclosure, an electronic device is provided, including: at least one processor; and a memory communicatively connected with the at least one processor; wherein the memory stores instructions executable by the at least one processor, which, when executed by the at least one processor, enable the at least one processor to execute the method in any embodiment of the present disclosure.

According to another aspect of the present disclosure, a non-transitory computer readable storage medium storing computer instructions is provided, wherein the computer instructions, when executed by a processor, cause a computer to execute the method in any embodiment of the present disclosure.

The technical solution of the embodiments of the present disclosure extracts the two-dimensional road based on the satellite remote sensing image, skeletonizes the two-dimensional road to obtain the two-dimensional road network map, determines the height of each point in the two-dimensional road network map based on the elevation of the three-dimensional point cloud data, realizing the automatic construction of the three-dimensional road network map, and having low mapping cost, strong operability, and high practicability, and the three-dimensional road network map obtained by fusing the satellite remote sensing image and the three-dimensional point cloud data improves data integrity and map precision, enhances accuracy and reliability and improves the user experience.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTION OF THE DRAWINGS

The accompanying drawings are used for better understanding of the present solution, and do not constitute a limitation to the present disclosure. In the drawings.

DETAILED DESCRIPTION

The example embodiments of the present disclosure are described below in combination with the accompanying drawings, including various details of the embodiments of the present disclosure to facilitate understanding, which should be considered only exemplary. Therefore, those ordinarily skilled in the art should recognize that various changes and modifications may be made to the embodiments described herein without departing from the scope and spirit of the present disclosure. Similarly, for clarity and conciseness, the description of well-known functions and structures is omitted from the following description.

The technical solution of the embodiments of the present disclosure is applied to scenarios for constructing a map. In order to solve the problems of low precision and incomplete representation of a two-dimensional road network map, a method and apparatus for constructing a three-dimensional road network map are provided, and the three-dimensional road network map is constructed based on fusion of a satellite remote sensing image and three-dimensional point cloud data, not only realizing the automatic construction of the three-dimensional road network map, but also improving the data integrity and map precision, enhancing the accuracy and reliability, and improving the user experience. Satellite remote sensing refers to the general term of various comprehensive technical systems for observing the earth and celestial bodies from the ground to space. The satellite remote sensing image refers to films or photos that record the magnitude of electromagnetic waves of various ground objects based on a satellite remote sensing technology. The three-dimensional point cloud data mean that the scanned data are recorded in the form of points, each point contains three-dimensional coordinates, and some may contain color information (RGB) or reflection intensity information (Intensity). The advantages of using the satellite remote sensing image are that the image range is large and the data integrity is high, thereby improving the precision of the map. The advantages of the three-dimensional point cloud data are that the height information is comprehensive and the accuracy is high, so that the precision of the height information in the three-dimensional road network map can be fully guaranteed. Compared with the two-dimensional road network map, the three-dimensional road network map, constructed based on the fusion of the satellite remote sensing image and the three-dimensional point cloud data, greatly improves the precision and accuracy of the map. The constructed three-dimensional road network map can be used for positioning and navigation, high-precision maps, automatic driving, intelligent transportation, smart city and other fields, which can improve the user experience.

Figure 1:
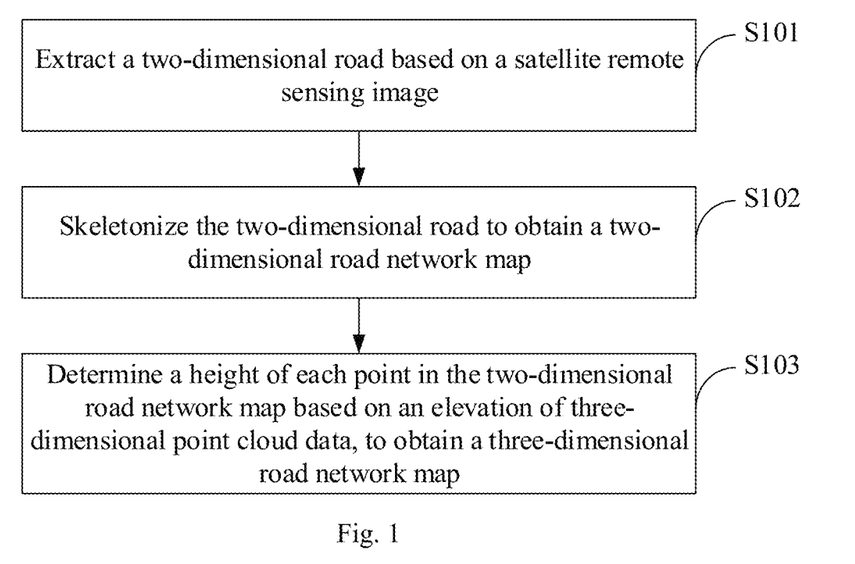
FIG. 1 is a schematic diagram of a method for constructing a three-dimensional road network map according to an embodiment of the present disclosure.

FIG. 1 is a schematic diagram of a method for constructing a three-dimensional road network map according to an embodiment of the present disclosure. As shown in FIG. 1, the method includes: S101: extracting a two-dimensional road based on a satellite remote sensing image; S102: skeletonizing the two-dimensional road to obtain a two-dimensional road network map; and S103: determining a height of each point in the two-dimensional road network map based on an elevation of three-dimensional point cloud data, to obtain a three-dimensional road network map.

In one implementation, skeletonizing the two-dimensional road to obtain the two-dimensional road network map includes: skeletonizing the two-dimensional road, and determining a skeleton node segment based on skeleton nodes in the skeletonized two-dimensional road; and converting, for the skeleton node segment, a pixel coordinate into a geographic coordinate, to obtain the two-dimensional road network map.

In this implementation, redundant information in the two-dimensional road can be removed through skeletonizing, and lines of the image can be reduced from a multi-pixel width to a unit pixel width, so that the structure of the road is clearer and more concise, the actual condition of the road can be clearly expressed, and computing resources can be saved and processing efficiency can be improved for subsequent operations.

In one implementation, converting, for the skeleton node segment, the pixel coordinate into the geographic coordinate, to obtain the two-dimensional road network map includes: performing road thinning on the skeleton node segment, to obtain a two-dimensional road network map composed of breaks and polygonal line segments.

In this implementation, a simplified road network that retains connectivity attributes and general characters may be generated through road thinning, so that displaying at a smaller scale is achieved, that is, irrelevant features may be removed from the view, and a simple but representative road set may be generated to facilitate subsequent analysis and calculation, save the computing resources, and further improve processing efficiency.

In one implementation, determining the height of each point in the two-dimensional road network map based on the elevation of the three-dimensional point cloud data, to obtain the three-dimensional road network map includes: obtaining a plane point cloud based on the three-dimensional point cloud data; and determining, for each point in the two-dimensional road network map, associated points of the point in the plane point cloud, and determining a height of the point according to elevations of the associated points, to obtain a three-dimensional road network map.

In this implementation, the associated points of each point in the map are obtained in the plane point cloud based on the three-dimensional point cloud data, and then a height of each point is determined, so as to ensure that the height precision of the three-dimensional road network map and improve the accuracy and reliability.

In one implementation, obtaining the plane point cloud based on the three-dimensional point cloud data includes: filtering the three-dimensional point cloud data to obtain a three-dimensional ground point cloud, and setting a z coordinate in the three-dimensional ground point cloud to be zero to obtain the plane point cloud.

In this implementation, the plane point cloud is obtained based on the three-dimensional point cloud data, so that the associated points of each point in the map can be determined in the plane point cloud later. This process does not need to consider the z coordinate, so the plane point cloud is obtaining by processing first and then calculation is performed, thereby improving processing efficiency and saving the computing resources.

In one implementation, determining, for each point in the two-dimensional road network map, the associated points in the plane point cloud, and determining a height of the point according to the elevations of the associated points, to obtain the three-dimensional road network map includes: taking, for each point in the two-dimensional road network map, the point as a current node, performing a neighbor search on the plane point cloud with the current node as a center to obtain a plurality of associated points of the current node, and determining a height of the current node according to elevations of the plurality of associated points and a preset threshold, to finally obtain the three-dimensional road network map.

In this implementation, the distances between the associated points obtained based on the neighbor search and the current node are closely related, and the elevations of the associated points have an important reference value for the height of the current node. Therefore, the height of the current node is determined based on the elevations of the associated points, the result is more accurate, and the obtained three-dimensional road network map is more accurate.

In one implementation, determining the height of the current node according to the elevations of the plurality of associated points and the preset threshold includes: averaging the elevations of the plurality of associated points to obtain an average value; calculating an elevation difference between each two points of the plurality of associated points and comparing the elevation differences, to determine a maximum elevation difference; determining the average value as the height of the current node, if the maximum elevation difference is less than the preset threshold; and determining a height of an associated point of the plurality of associated points closest to the current point as the height of the current node, if the maximum elevation difference is not less than the preset threshold.

In this embodiment, the case where the maximum elevation difference is less than the preset threshold indicates that the heights of the associated points and the current node are relatively close, and there is not much difference, so the height of the current node can be determined by the average value of the elevations; and the case where the maximum elevation difference is not less than the preset threshold indicates that there is a certain difference between the heights of the associated points and the current node, so the height of the associated point closest to the current node is selected as the height of the current node, which is closer to the real situation of the road surface, the obtained three-dimensional road network map is more accurate and reliable, and the error is smaller.

In one implementation, the method further includes: constructing, for each road in the three-dimensional road network map, a vertical curve is constructed according to a distance from each point of the road to a starting point of the road and a height of each point on the road, and performing Bezier curve smoothing on the vertical curve, to update the height of each point on the road to be a height after smoothing.

In this implementation, the height of each point on the road obtained after constructing the vertical curve and the Bessel curve smoothing is further optimized, which improves the precision and reliability of the three-dimensional road network map.

In one implementation, extracting the two-dimensional road based on the satellite remote sensing image includes: performing semantic segmentation for a road network in the satellite remote sensing image, and converting the satellite remote sensing image after the semantic segmentation into a binary image to obtain the two-dimensional road.

In this implementation, the two-dimensional road is obtained through semantic segmentation, which can completely reflect the road conditions, and resulting data are more complete and reliable.

The above method of the embodiment of the present disclosure extracts the two-dimensional road based on the satellite remote sensing image, skeletonizes the two-dimensional road to obtain the two-dimensional road network map, determines the height of each point in the two-dimensional road network map based on the elevation of the three-dimensional point cloud data, realizing the automatic construction of the three-dimensional road network map, and having low mapping cost, strong operability, and high practicability, and the three-dimensional road network map obtained by fusing the satellite remote sensing image and the three-dimensional point cloud data improves data integrity and map precision, and enhances accuracy and reliability.

Figure 2:
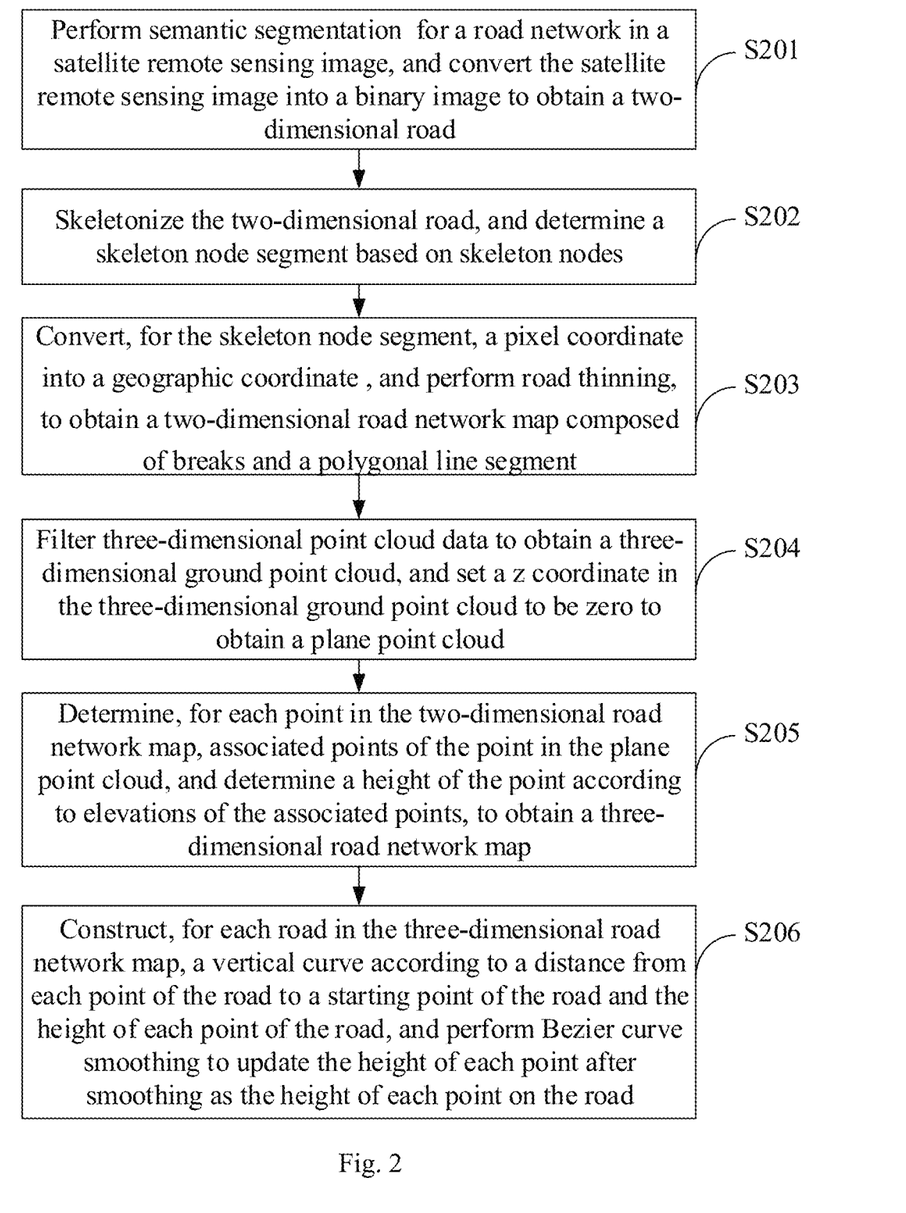
FIG. 2 is a schematic diagram of a method for constructing a three-dimensional road network map according to another embodiment of the present disclosure.

FIG. 2 is a schematic diagram of a method for constructing a three-dimensional road network map according to an embodiment of the present disclosure. As shown in FIG. 2, the method includes: S201: performing semantic segmentation for the road network in the satellite remote sensing image, and converting the satellite remote sensing image to obtain the two-dimensional road, to obtain the binary image.

In the embodiment of the present disclosure, a multi-task learning model Multi-Task Road Extractor provided in the ArcGIS Application Programming Interface (API) for Python (computer programming language) may be used to perform semantic segmentation for the road network on the satellite remote sensing image. An ArcGIS product line provides users with a scalable, comprehensive Geographic Information System (GIS) platform. ArcObjects contains a plurality of programmable components, ranging from fine-grained objects (such as individual geometry objects) to coarse-grained objects (such as map objects that interact with existing ArcMap documents), the involved aspects are extremely wide, and the objects integrate comprehensive GIS functionality for developers.

In the embodiment of the present disclosure, the result of semantic segmentation may be converted into the binary image, that is, each pixel on the image has only two possible values or gray level states, which may usually be represented by black and white, B&W, or monochrome images. For example, any pixel in an image has a grayscale value of 0 or 255, representing black and white respectively.

Figure 3:
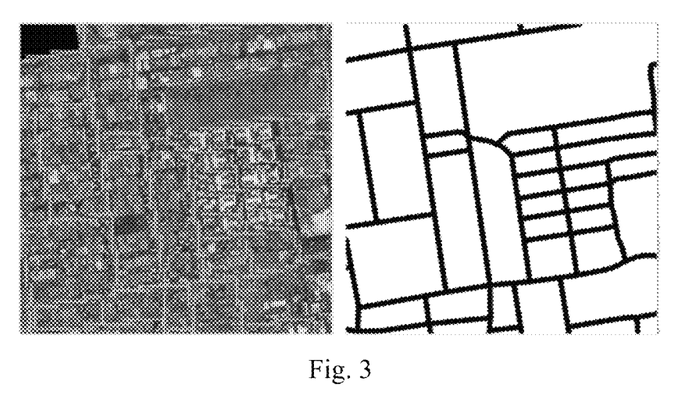
FIG. 3 is a schematic diagram of semantic segmentation of a satellite remote sensing image according to an embodiment of the present disclosure.

FIG. 3 is a schematic diagram of semantic segmentation of a satellite remote sensing image according to an embodiment of the present disclosure. A left picture is the satellite remote sensing image, and a right picture is the two-dimensional road obtained after semantic segmentation of the satellite remote sensing image and then converting it into the binary image. It can be seen that there are only black pixels and white pixels in the picture, and the black pixels clearly indicate the road conditions.

S202: the two-dimensional road is skeletonized, and the skeleton node segment is determined based on the skeleton nodes.

In the embodiment of the present disclosure, skeletonize may also be understood as image refinement. The so-called refinement is to remove some points from the original image after layer-by-layer peeling, but still maintain the original shape until the skeleton of the image is obtained. The skeleton may be understood as the central axis of an object. For example, a rectangular skeleton is its central axis in a long direction; a square skeleton is its center point; and a circle skeleton is its center, and a straight skeleton is itself, and an isolated point skeleton is also itself. Obtaining the skeleton is equivalent to highlighting the main structure and shape information of the object, and removing redundant information. According to the information, the detection of feature points on the image, such as endpoints, intersections and inflection points, may be realized.

Figure 4:
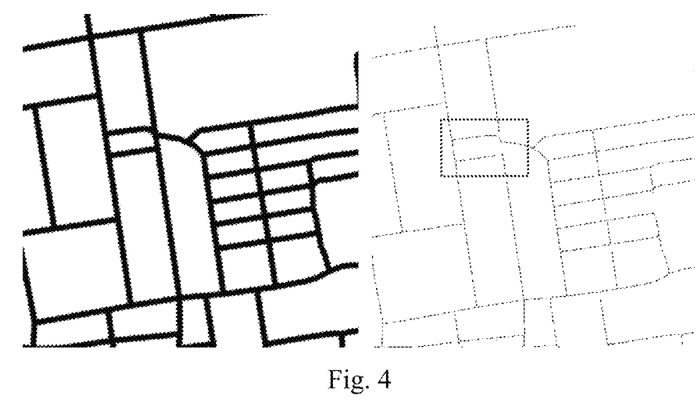
FIG. 4 is a schematic diagram of skeletonization according to an embodiment of the present disclosure.

FIG. 4 is a schematic diagram of skeletonization according to an embodiment of the present disclosure. A left picture is the two-dimensional road obtained based on the satellite remote sensing image, and the road obtained after skeletonizing the two-dimensional road is shown in the right picture. It can be seen intuitively from the figure that the thick lines become thin lines after skeletonization, but they can still reflect the road conditions, and the overall road structure has not changed.

In the embodiment of the present disclosure, the skeleton nodes may be determined based on the statistics of the quantity of black pixels in the neighborhood. Specifically, for each point on the road, statistical analysis of a neighborhood of a specified size may be performed with the point as the center, the quantity of black pixels in the neighborhood may be counted, and if the preset conditions are met, the point is determined as the skeleton node. For example, for each point on the road, statistical analysis of the 3*3 neighborhood is performed with the point as the center, the quantity of black pixels in the 3*3 neighborhood is counted, and if it is greater than or equal to 4 or equal to 2, then the point is determined as the skeleton node.

Figure 5:
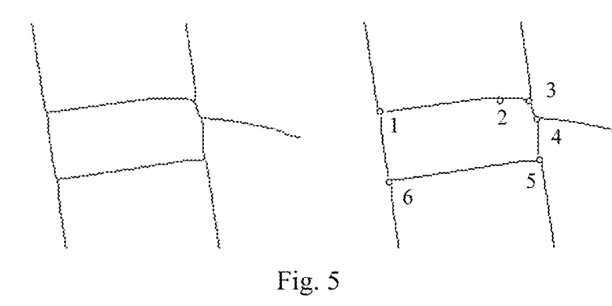
FIG. 5 is a schematic diagram for determining a skeleton node segment according to an embodiment of the present disclosure.

FIG. 5 is a schematic diagram for determining a skeleton node segment according to an embodiment of the present disclosure. The region within the dotted-line frame in FIG. 4 is used as an example for description. Where, the left picture is the two-dimensional road in the region, and the skeleton nodes in each road are determined according to the neighborhood statistical analysis, so as to obtain the skeleton nodes 1, 2, 3, 4, 5 and 6 shown in the right picture. Then skeleton line traversing is performed according to the obtained skeleton nodes to obtain the skeleton node segment. For example, taking the skeleton nodes 1 and 2 as an example, any point between the two points is taken, the surrounding black pixels are recursively traversed until encountering the skeleton nodes 1 and 2, then these two points are regarded as the endpoints, and a pixel chain between the two endpoints constructs a skeleton node segment 1-2. Similarly, skeleton node segments 2-3, 3-4, 4-5, 6-5 and 1-6 may also be obtained.

S203: the pixel coordinate is converted into the geographic coordinate for the skeleton node segment, and road thinning is performed, to obtain the two-dimensional road network map composed of the breaks and the polygonal line segments.

In the embodiment of the present disclosure, a simplified road network that retains connectivity attributes and general characters may be generated through road thinning, so that displaying at a smaller scale is achieved, irrelevant features are identified by specifying a value in the invisibility field of the input feature class, the irrelevant features may be removed from the view, and a simple but representative road set is generated. The generated simplified road set will be determined by the meaning, importance, and density of the features. In the two-dimensional road network map obtained after road thinning, each road is composed of breaks and polygonal line segments, which is greatly simplified compared with the quantity of the skeleton nodes and skeleton node segments. Taking the skeleton node segment 1-2 in FIG. 5 as an example, there are 100 pixels between the nodes 1 and 2. After the road thinning, 4 points may be obtained, and 5 polygonal line segments are obtained from the nodes 1 and 2 and these 4 points, and form the road from the node 1 to the node 2. After each road is processed above, the entire two-dimensional road network map composed of the breaks and the polygonal line segments may be finally obtained.

In some embodiments, the Douglas-Peucker algorithm may be used for road thinning, which may also be referred to as the Lamer-Douglas-Peucker algorithm, the iterative adaptive point algorithm or the split and merge algorithm, and is an algorithm that the curve approximates a series of points and the quantity of points is reduced. The advantage is that translation and rotation invariance are achieved, and a sampling result is certain after the curve and the threshold are given.

In the embodiment of the present disclosure, the density of the two-dimensional road network map generated by road thinning may be determined by the minimum length parameter, which corresponds to the shortest line segment that needs to be clearly displayed at the current scale. For example, the minimum interval between two points in the map is 10 m, and the maximum interval is 30 m as the corresponding parameters to perform road thinning, to obtain the two-dimensional road network map with suitable precision.

S204: the three-dimensional point cloud data are filtered to obtain the three-dimensional ground point cloud, and the z coordinate in the three-dimensional ground point cloud is set to be zero to obtain the plane point cloud.

In the embodiment of the present disclosure, the three-dimensional ground point cloud may be obtained by performing filtering on the three-dimensional point cloud data of an airborne laser radar. The attribute "elevation" of each point in the 3D ground point cloud may be assigned using the z coordinate value. The way to obtain the plane point cloud may be realized by setting the z coordinate value in the xyz coordinates of the three-dimensional ground point cloud to be zero, which is simple and easy to implement.

S205: for each point in the two-dimensional road network map, the associated points are determined in the plane point cloud, and the height of the point is determined according to the elevations of the associated points, to obtain the three-dimensional road network map.

Where, there may be one or more associated points of a point, which is not specifically limited, and a nearest neighbor search algorithm may be used to determine the associated points. For example, a K-Nearest Neighbor (KNN) search algorithm may be used to determine the associated points of each point, which will not be described here.

In one implementation, the above step S205 may include: for each point in the two-dimensional road network map, taking the point as the current node, performing the neighbor search on the plane point cloud with the current node as a center to obtain the plurality of associated points of the current node, and determining the height of the current node according to the elevations of the plurality of associated points and the preset threshold, to finally obtain the three-dimensional road network map.

S206: for each road in the three-dimensional road network map, the vertical curve is constructed according to the distance from each point of the road to the starting point of the road and the height of each point on the road, and Bezier curve smoothing is performed to update the height of each point on the road as the height after smoothing.

The above step S206 is the optimization process of the road height. In some embodiments, the height of each point on the road may be used as a y value, and the distance from each point on the road to the starting point of the road may be used as an x value to construct the vertical curve, Bezier curve smoothing is performed on the vertical curve, and the smoothed y value is updated as the new height of each point, thereby further improving the precision of the map height.

Figure 6:
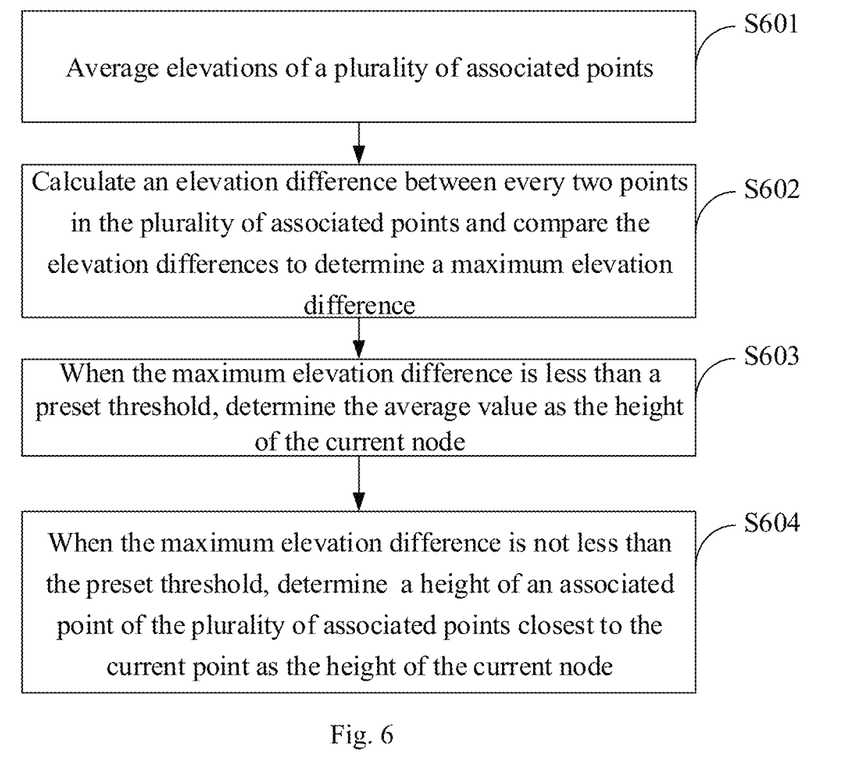
FIG. 6 is a schematic flow diagram for determining a height of a current node according to an embodiment of the present disclosure.

FIG. 6 is a schematic flow diagram for determining a height of a current node according to an embodiment of the present disclosure. As shown in FIG. 6, in one implementation, determining the height of the current node according to the elevations of the plurality of associated points and the preset threshold may include the following steps.

S601: the elevations of the plurality of associated points are averaged.

In some embodiments, KNN nearest neighbor search is performed on the plane point cloud with the current node as the center to obtain three associated points of the current node, and M is obtained by averaging the elevations of the three associated points.

S602: the elevation difference between each two points in the plurality of associated points is calculated and compared to determine the maximum elevation difference.

The elevation differences involved in the embodiment of the present disclosure all refer to absolute values, so as to facilitate comparison. In some embodiments, the elevation difference between each two points in the three associated points is calculated, and compared to obtain a maximum elevation difference K.

S603: if the maximum elevation difference is less than the preset threshold, the average value is determined as the height of the current node.

S604: if the maximum elevation difference is not less than the preset threshold, the height of the associated point of the plurality of associated points closest to the current point is determined as the height of the current node.

Where, the above preset threshold may be set as required, and the specific value is not limited. Since the distance between points in the point cloud data is usually 0.5-1 m, the threshold may be set according to the precision, such as 0.5 m. In some embodiments, if K<0.5 m, the above average value M is determined as the height of the current node, and if K≥0.5 m, the height of the associated point closest to the current node is determined as the height of the current node.

The above method of the embodiment of the present disclosure extracts the two-dimensional road based on the satellite remote sensing image, skeletonizes the two-dimensional road to obtain the two-dimensional road network map, determines the height of each point in the two-dimensional road network map based on the elevation of the three-dimensional point cloud data, realizing the automatic construction of the three-dimensional road network map, and having low mapping cost, strong operability, and high practicability, and the three-dimensional road network map obtained by fusing the satellite remote sensing image and the three-dimensional point cloud data improves data integrity and map precision, enhances accuracy and reliability, and improves the user experience.

Figure 7:
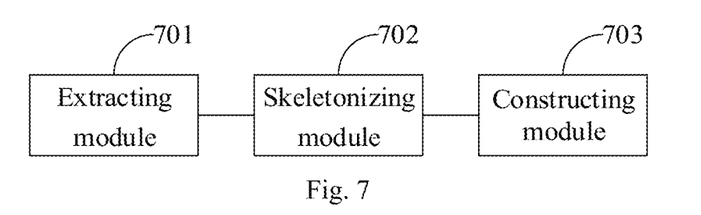
FIG. 7 is a block diagram of an apparatus for constructing a three-dimensional road network map according to an embodiment of the present disclosure.

FIG. 7 is a block diagram of an apparatus for constructing a three-dimensional road network map according to an embodiment of the present disclosure. As shown in FIG. 7, the apparatus includes: an extracting module 701, configured to extract a two-dimensional road based on a satellite remote sensing image; a skeletonizing module 702, configured to skeletonize the two-dimensional road to obtain a two-dimensional road network map; and a constructing module 703, configured to determine a height of each point in the two-dimensional road network map based on an elevation of three-dimensional point cloud data, to obtain the three-dimensional road network map.

In one implementation, the skeletonizing module 702 includes: a skeletonizing unit, configured to skeletonize the two-dimensional road, and determine a skeleton node segment based on skeleton nodes; and a converting unit, configured to convert, for the skeleton node segment, a pixel coordinate into a geographic coordinate to obtain the two-dimensional road network map.

In one implementation, the converting unit is configured to: convert, for the skeleton node segment, the pixel coordinate into the geographic coordinate, and perform road thinning, to obtain the two-dimensional road network map composed of breaks and polygonal line segments.

In one implementation, the constructing module 703 includes: a processing unit, configured to obtain a plane point cloud based on the three-dimensional point cloud data; and a constructing unit, configured to determine, for each point in the two-dimensional road network map, associated points in the plane point cloud, and determine a height of the point according to elevations of the associated points, to obtain the three-dimensional road network map.

In one implementation, the processing unit is configured to: filter the three-dimensional point cloud data to obtain a three-dimensional ground point cloud, and set a z coordinate in the three-dimensional ground point cloud to be zero to obtain the plane point cloud.

In one implementation, the constructing unit is configured to: Take, for each point in the two-dimensional road network map, the point as a current node, perform a neighbor search on the plane point cloud with the current node as a center to obtain the plurality of associated points of the current node, determine a height of the current node according to the elevations of the plurality of associated points and a preset threshold, and finally obtain the three-dimensional road network map.

In one implementation, when determining the height of the current node according to the elevations of the plurality of associated points and the preset threshold, the constructing unit is specifically configured to: average the elevations of the plurality of associated points; calculate an elevation difference between each two points of the plurality of associated points and compare the elevation differences to determine the maximum elevation difference; determine the average value as the height of the current node, if the maximum elevation difference is less than the preset threshold; and determine the height of the associated point of the plurality of associated points closest to the current point as the height of the current node, if the maximum elevation difference is not less than the preset threshold.

In one implementation, the apparatus further includes: an optimizing module, configured to construct, for each road in the three-dimensional road network map, a vertical curve according to a distance from each point of the road to a starting point of the road and the height of each point on the road, and perform Bezier curve smoothing to update the height of each point on the road to be a height after smoothing.

In one implementation, the extracting module 701 is configured to: perform semantic segmentation for a road network in the satellite remote sensing image, and convert the satellite remote sensing image into a binary image to obtain the two-dimensional road.

The above apparatus provided by the embodiment of the present disclosure can execute the method provided in any of the above method embodiments. For the specific process, please refer to the description in the above method embodiments, which will not be repeated here.

The above apparatus of the embodiment of the present disclosure extracts the two-dimensional road based on the satellite remote sensing image, skeletonizes the two-dimensional road to obtain the two-dimensional road network map, determines the height of each point in the two-dimensional road network map based on the elevation of the three-dimensional point cloud data, realizing the automatic construction of the three-dimensional road network map, and having low mapping cost, strong operability, and high practicability, and the three-dimensional road network map obtained by fusing the satellite remote sensing image and the three-dimensional point cloud data improves data integrity and map precision, enhances accuracy and reliability and improves the user experience.

In the technical solution of the present disclosure, involved acquisition, storage and application of personal information of users comply with the provisions of relevant laws and regulations, and do not violate public order and good customs.

Figure 8:
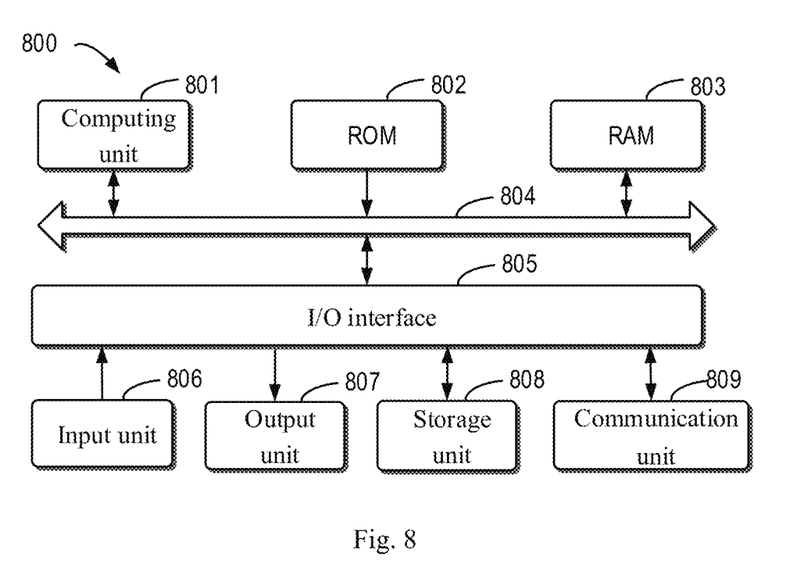
FIG. 8 is a block diagram of an electronic device configured to implement a method for constructing a three-dimensional road network map according to an embodiment of the present disclosure.

According to embodiments of the present disclosure, the present disclosure further provides an electronic device, a readable storage medium and a computer program product. FIG. 8 illustrates a schematic block diagram of an example electronic device 800 configured to implement an embodiment of the present disclosure. The electronic device is intended to represent various forms of digital computers, such as, a laptop computer, a desktop computer, a workstation, a personal digital assistant, a server, a blade server, a mainframe computer, and other suitable computers. The electronic device may further represent various forms of mobile apparatuses, such as, personal digital processing, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 8, the device 800 includes a computing unit 801 that may perform various appropriate actions and processing according to computer programs stored in a read-only memory (ROM) 802 or computer programs loaded from a storage unit 808 into a random access memory (RAM) 803. In the RAM 803, various programs and data required for the operation of the device 800 may also be stored. The computing unit 801, the ROM 802 and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disk; and a communication unit 809, such as a network card, a modem and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 performs various methods and processing described above, such as the method for constructing the three-dimensional road network map. For example, in some embodiments, the method for constructing the three-dimensional road network map may be implemented as a computer software program that is tangibly included in a machine-readable medium such as the storage unit 808. In some embodiments, part or all of the computer program may be loaded and/or installed onto the device 800 via the ROM 802 and/or the communication unit 809. When the computer programs are loaded into the RAM 803 and executed by the computing unit 801, one or more steps of the method for constructing the three-dimensional road network map described above may be performed. Alternatively, in other embodiments, the computing unit 801 may be configured to perform the method for constructing the three-dimensional road network map in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact through a communication network. The relationship between the client and the server is generated by computer programs running on the corresponding computer and having a client-server relationship with each other. The server may be a cloud server, and may also be a server of a distributed system, or a server combined with a block chain.

It should be understood that the various forms of processes shown above may be used to reorder, add, or delete steps. For example, the steps recorded in the present disclosure may be performed in parallel, sequentially or in different orders as long as the desired results of the technical solution disclosed by the present disclosure can be achieved, which is not limited herein.

The above specific embodiments do not constitute a limitation on the protection scope of the present disclosure. It should be understood by those skilled in the art that various modifications, combinations, sub-combinations and substitutions may occur depending on design requirements and other factors. Any modification, equivalent replacement, improvement, etc. made within the spirit and principle of the present disclosure should be included in the protection scope of the present disclosure.

What is claimed is:

1. A method for constructing a three-dimensional road network map, the method comprising:
   extracting a two-dimensional road based on a satellite remote sensing image;
   skeletonizing the two-dimensional road to obtain a two-dimensional road network map; and
   determining a height of each point in the two-dimensional road network map based on an elevation of three-dimensional point cloud data, to obtain the three-dimensional road network map, wherein the determining the height of each point in the two-dimensional road network map based on the elevation of the three-dimensional point cloud data, to obtain the three-dimensional road network map comprises:
      obtaining a plane point cloud based on the three-dimensional point cloud data;
      determining, for a point in the two-dimensional road network map, one or more associated points of the point in the plane point cloud; and
      determining a height of the point according to elevation of the one or more associated points, to obtain the three-dimensional road network map.

2. The method according to claim 1, wherein the skeletonizing the two-dimensional road to obtain the two-dimensional road network map comprises:
   skeletonizing the two-dimensional road, and determining a skeleton node segment based on skeleton nodes in the skeletonized two-dimensional road; and
   converting, for the skeleton node segment, a pixel coordinate into a geographic coordinate, to obtain the two-dimensional road network map.

3. The method according to claim 2, wherein the converting, for the skeleton node segment, the pixel coordinate into the geographic coordinate, to obtain the two-dimensional road network map comprises:
   performing road thinning on the skeleton node segment, to obtain the two-dimensional road network map composed of breaks and a polygonal line segment.

4. The method according to claim 1, wherein the obtaining the plane point cloud based on the three-dimensional point cloud data comprises:
   filtering the three-dimensional point cloud data to obtain a three-dimensional ground point cloud; and
   setting a z coordinate in the three-dimensional ground point cloud to be zero to obtain the plane point cloud.

5. The method according to claim 1, wherein the determining, for the point in the two-dimensional road network map, the one or more associated points of the point in the plane point cloud, and determining the height of the point according to the elevation of the one or more associated points, to obtain the three-dimensional road network map comprises:
   setting the point in the two-dimensional road network map as a current node;
   performing a neighbor search on the plane point cloud with the current node as a center to obtain a plurality of associated points of the current node; and
   determining a height of the current node according to elevations of the plurality of associated points and a preset threshold, to obtain the three-dimensional road network map.

6. The method according to claim 5, wherein the determining the height of the current node according to the elevations of the plurality of associated points and the preset threshold comprises:
   averaging the elevations of the plurality of associated points to obtain an average value;
   calculating an elevation difference between each two associated points of the plurality of associated points;
   comparing the elevation differences to determine a maximum elevation difference;
   determining the average value as the height of the current node based on the maximum elevation difference being less than the preset threshold; and
   determining a height of an associated point of the plurality of associated points closest to the current point as the height of the current node based on the maximum elevation difference being equal to or greater than the preset threshold.

7. The method according to claim 1, further comprising:
   constructing, for each road in the three-dimensional road network map, a vertical curve according to a distance from each point of the road to a starting point of the road and a height of each point of the road; and
   performing smoothing on the vertical curve to update the height of each point of the road.

8. The method according to claim 1, wherein the extracting the two-dimensional road based on the satellite remote sensing image comprises:
   performing semantic segmentation for a road network in the satellite remote sensing image; and
   converting the satellite remote sensing image after performing the semantic segmentation into a binary image to obtain the two-dimensional road.

9. An electronic device, comprising:
   at least one processor; and
   a memory communicatively connected with the at least one processor, wherein the memory stores instructions executable by the at least one processor that, when executed by the at least one processor, enable the at least one processor to execute actions including:
      extracting a two-dimensional road based on a satellite remote sensing image;
      skeletonizing the two-dimensional road to obtain a two-dimensional road network map; and
      determining a height of each point in the two-dimensional road network map based on an elevation of three-dimensional point cloud data, to obtain the three-dimensional road network map, wherein the determining the height of each point in the two-dimensional road network map based on the elevation of the three-dimensional point cloud data, to obtain the three-dimensional road network map comprises:
         obtaining a plane point cloud based on the three-dimensional point cloud data;
         determining, for a point in the two-dimensional road network map, one or more associated points of the point in the plane point cloud; and determining a height of the point according to elevation of the one or more associated points, to obtain the three-dimensional road network map.

10. The electronic device according to claim 9, wherein the skeletonizing the two-dimensional road to obtain the two-dimensional road network map comprises:
    skeletonizing the two-dimensional road, and determining a skeleton node segment based on skeleton nodes in the skeletonized two-dimensional road; and
    converting, for the skeleton node segment, a pixel coordinate into a geographic coordinate, to obtain the two-dimensional road network map.

11. The electronic device according to claim 10, wherein the converting, for the skeleton node segment, the pixel coordinate into the geographic coordinate, to obtain the two-dimensional road network map comprises:
    performing road thinning on the skeleton node segment, to obtain the two-dimensional road network map composed of breaks and a polygonal line segment.

12. The electronic device according to claim 9, wherein the obtaining the plane point cloud based on the three-dimensional point cloud data comprises:
    filtering the three-dimensional point cloud data to obtain a three-dimensional ground point cloud; and
    setting a z coordinate in the three-dimensional ground point cloud to be zero to obtain the plane point cloud.

13. The electronic device according to claim 9, wherein the determining, for the point in the two-dimensional road network map, the one or more associated points of the point in the plane point cloud, and determining the height of the point according to the elevation of the one or more associated points, to obtain the three-dimensional road network map comprises:
    setting the point in the two-dimensional road network map as a current node;
    performing a neighbor search on the plane point cloud with the current node as a center to obtain a plurality of associated points of the current node; and
    determining a height of the current node according to elevations of the plurality of associated points and a preset threshold, to obtain the three-dimensional road network map.

14. The electronic device according to claim 13, wherein the determining the height of the current node according to the elevations of the plurality of associated points and the preset threshold comprises:
    averaging the elevations of the plurality of associated points to obtain an average value;
    calculating an elevation difference between each two associated points of the plurality of associated points;
    comparing the elevation differences to determine a maximum elevation difference;
    determining the average value as the height of the current node based on the maximum elevation difference being less than the preset threshold; and
    determining a height of an associated point of the plurality of associated points closest to the current point as the height of the current node based on the maximum elevation difference being equal to or greater than the preset threshold.

15. The electronic device according to claim 9, further comprising:
    constructing, for each road in the three-dimensional road network map, a vertical curve according to a distance from each point of the road to a starting point of the road and a height of each point of the road; and
    performing smoothing on the vertical curve to update the height of each point of the road.

16. The electronic device according to claim 9, wherein the extracting the two-dimensional road based on the satellite remote sensing image comprises:
    performing semantic segmentation for a road network in the satellite remote sensing image; and
    converting the satellite remote sensing image after performing the semantic segmentation into a binary image to obtain the two-dimensional road.

17. A non-transitory computer readable storage medium storing computer instructions, wherein the computer instructions, when executed by a processor, are configured to cause a computer to execute actions including:
    extracting a two-dimensional road based on a satellite remote sensing image;
    skeletonizing the two-dimensional road to obtain a two-dimensional road network map; and
    determining a height of each point in the two-dimensional road network map based on an elevation of three-dimensional point cloud data, to obtain the three-dimensional road network map, wherein the determining the height of each point in the two-dimensional road network map based on the elevation of the three-dimensional point cloud data, to obtain the three-dimensional road network map comprises:
        obtaining a plane point cloud based on the three-dimensional point cloud data;
        determining, for a point in the two-dimensional road network map, one or more associated points of the point in the plane point cloud; and
        determining a height of the point according to elevation of the one or more associated points, to obtain the three-dimensional road network map.

18. The non-transitory computer readable storage medium according to claim 17, wherein the skeletonizing the two-dimensional road to obtain the two-dimensional road network map comprises:
    skeletonizing the two-dimensional road, and determining a skeleton node segment based on skeleton nodes in the skeletonized two-dimensional road; and
converting, for the skeleton node segment, a pixel coordinate into a geographic coordinate, to obtain the two-dimensional road network map.

* * * * *